(No Model.)

W. WILLIAMS, Jr.
HEDGE TRIMMER.

No. 323,010. Patented July 28, 1885.

Witnesses:
William E. Maris,
Frank M. Hampton.

Inventor:
Wm. Williams, Jr.

United States Patent Office.

WILLIAM WILLIAMS, JR., OF SUGARTOWN, PENNSYLVANIA.

HEDGE-TRIMMER.

SPECIFICATION forming part of Letters Patent No. 323,010, dated July 28, 1885.

Application filed August 30, 1884. (No model.)

*To all whom it may concern:*

Be it known that I, WILLIAM WILLIAMS, Jr., a citizen of the United States, residing at Sugartown, in the county of Chester and State of Pennsylvania, have invented a new and useful Improvement in Hedge-Trimmers, of which the following is a specification.

My invention relates to improvements in hedge-trimmers in which an ordinary form of cutter-bar with guards and sectional knives is secured to a breastplate and fastened to the body of the operator in such manner as to be transported by him, while at the same time he can operate the machine by hand.

The object of my invention is to trim the top and sides of hedges, so that the faces trimmed may be made regular and even and not dependent upon nor to follow the inequalities of the ground, as is the case with the work of hedge-trimmers transported upon wheels.

Figure 1:
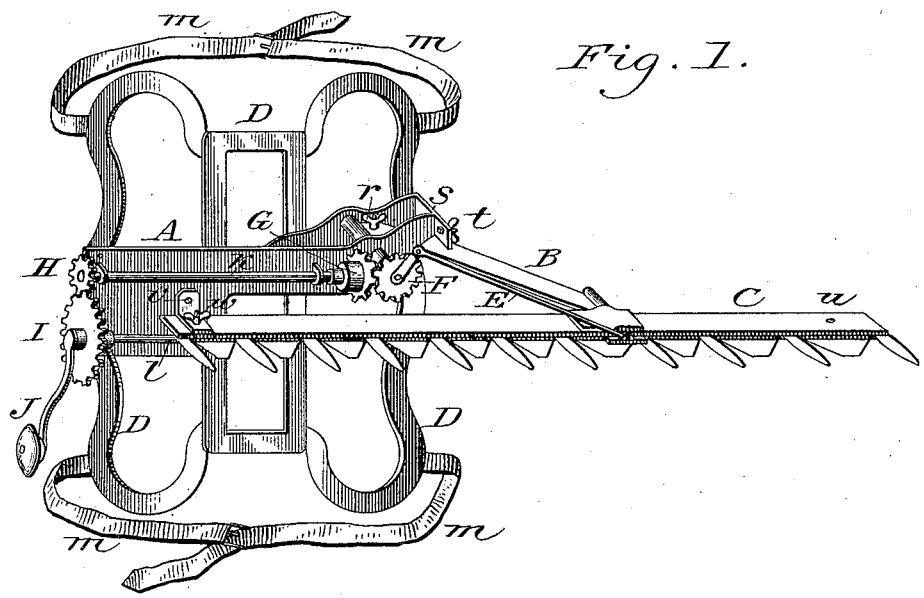
Figure 2:
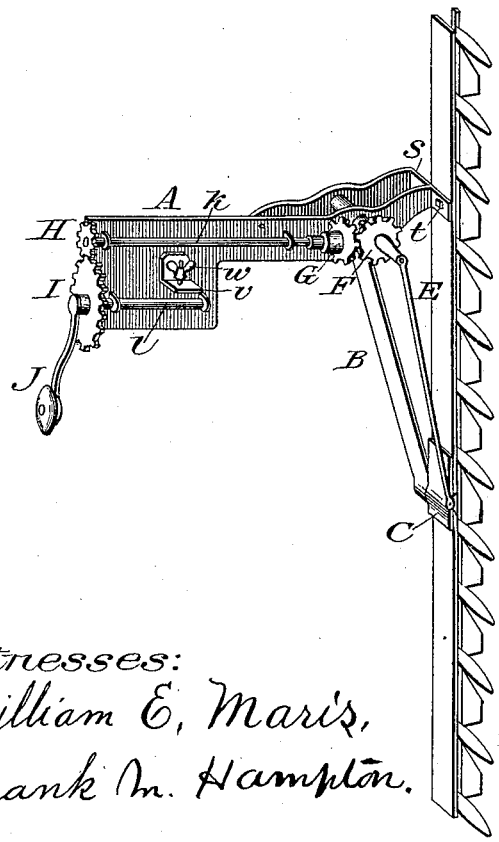

Referring to the drawings, Figure 1 is a side view of the machine in perspective with the cutter-bar adjusted horizontally. Fig. 2 is a side view of part of my device in perspective with the cutter-bar adjusted vertically.

Similar letters of reference refer to similar parts in each view.

In the accompanying drawings, A is a supporting-frame, upon which the different parts of the machine are secured. C is an ordinary form of cutter-bar provided with guards and connected with supporting-frame A by jointed connecting-bar B. Cutter-bar C is provided also with a set of sectional knives.

F is a miter-wheel provided with a crank for the purpose of reciprocating the knife-bar, motion being communicated to it by means of miter-wheel G, shaft $k$, spur-wheels H and I, and crank J.

$v$ is a small bracket upon frame A. $w$ is a bolt for the purpose of securing cutter-bar C in a horizontal position.

$s$ is a projection upon A, for the purpose of holding the cutter-bar in a vertical position, as in Fig. 2.

$t$ is a bolt to secure the cutter-bar in said position.

$r$ is a thumb-screw for the purpose of clamping bar B rigidly to frame A.

D is a breastplate, upon which the machine is secured. It is curved in such manner as to fit the body of the operator, to whom it is secured by straps $m$.

The device being buckled to the operator, and the bar being adjusted in a horizontal position by tightening thumb-screw $r$ and fastening the end of the bar to bracket $v$ by means of bolt $w$, as shown in Fig. 1, it is now suitably adjusted to trim the top of the hedge, the operator moving at the side of the hedge, communicating motion to the knives by means of crank J, wheels I, H, G, and F, shaft $k$, and connecting-rod E. He can also regulate the height of the cut with the view of making a uniform surface by raising or depressing the cutter-bar.

In trimming the sides of a hedge the cutter-bar is unfastened and swung into and secured in a vertical position by depressing the connecting-bar B and turning the cutter-bar on its pivot, then tightening thumb-screw $r$, and bolting the top of the cutter bar to projection $s$, as shown in Fig. 2.

I am aware that hedge-trimmers have been patented and long in use having the cutting apparatus secured to and transported upon wheels, and also provided with pivoted cutter-bars similar to those used in the ordinary mowing-machines. I make no claim to any such device.

What I claim is—

1. The centrally-pivoted cutter-bar C, in combination with the supporting-frame attached to the body of the operator, and mechanism, substantially as described, whereby it is adapted to be elevated or depressed and adjusted to cut horizontally or vertically, as set forth.

2. In a hedge-trimmer, a centrally-pivoted cutter-bar, in combination with the breastplate D and intermediate cutter-bar-supporting mechanism, as shown and described.

WILLIAM WILLIAMS, JR.

Witnesses:
F. S. HICKMAN,
JOS. H. THORNE.